US009776480B2

United States Patent
Yamazaki et al.

(10) Patent No.: US 9,776,480 B2
(45) Date of Patent: Oct. 3, 2017

(54) DOOR FRAME

(71) Applicant: SHIROKI CORPORATION, Fujisawa-shi (JP)

(72) Inventors: Hiroaki Yamazaki, Fujisawa (JP); Katsumasa Muramatsu, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 15/028,392

(22) PCT Filed: Oct. 9, 2014

(86) PCT No.: PCT/JP2014/077062
§ 371 (c)(1),
(2) Date: Apr. 8, 2016

(87) PCT Pub. No.: WO2015/056623
PCT Pub. Date: Apr. 23, 2015

(65) Prior Publication Data
US 2016/0257183 A1   Sep. 8, 2016

(30) Foreign Application Priority Data

Oct. 18, 2013   (JP) ................................ 2013-217075

(51) Int. Cl.
*B62D 25/04*   (2006.01)
*B60J 5/04*   (2006.01)

(52) U.S. Cl.
CPC .................................. *B60J 5/0402* (2013.01)

(58) Field of Classification Search
CPC ........ A47B 96/021; B65D 2543/00629; B65D 2543/00685; B65D 2543/00796;
(Continued)

(56) References Cited

U.S. PATENT DOCUMENTS 7,707,777 B2 *   5/2010   Takeuchi ............... B60J 5/0402
                                                       296/146.5
8,205,389 B1 *   6/2012   Kesh ..................... B60J 10/235
                                                            49/440
(Continued)

FOREIGN PATENT DOCUMENTS

CN   103806792 A   5/2014
JP   H 11-034666 A   2/1999
(Continued)

OTHER PUBLICATIONS

International Search Report (ISR) (PCT Form PCT/ISA/210), in PCT/JP2014/077062, dated Dec. 9, 2014.
(Continued)

*Primary Examiner* — Kiran B Patel
(74) *Attorney, Agent, or Firm* — McGinn IP Law Group, PLLC

(57) ABSTRACT

A door frame includes: a column, wherein the column includes: an outer member; and an inner member, which is attached to the outer member and of which at least a part is located at an inner side of the vehicle, wherein the outer member includes: a base portion; and a first bent portion that is bent at an end portion of the base portion and extends to the inner side of the vehicle, wherein the inner member includes: a side portion that has faces, which respectively face the base portion and the first bent portion, and wherein the first bent portion of the outer member is welded to the side portion of the inner member in a state where a gap is formed between the base portion of the outer member and the face of the side portion of the inner member, which faces the base portion.

4 Claims, 14 Drawing Sheets

(58) Field of Classification Search
CPC ............ B65H 2701/31; H01L 2924/00; H01L 2924/00014; H01L 2224/45144; H01L 2924/00015; H01L 2224/48463
USPC ...................................................... 296/146.5
See application file for complete search history.

(56) References Cited

U.S. PATENT DOCUMENTS

| | | | |
|---|---|---|---|
| 9,186,964 B2* | 11/2015 | Im ........................... | B60J 5/0402 |
| 2003/0042756 A1 | 3/2003 | Ogawa et al. | |
| 2004/0130179 A1* | 7/2004 | Masunaga .............. | B60J 5/0402 |
| | | | 296/146.5 |
| 2006/0037249 A1 | 2/2006 | Kawamura | |
| 2010/0181798 A1* | 7/2010 | Takeuchi ................ | B60R 13/04 |
| | | | 296/146.5 |
| 2011/0099912 A1* | 5/2011 | Ohtake .................. | B60J 5/0402 |
| | | | 49/502 |
| 2011/0204671 A1* | 8/2011 | Baratin ................. | B60J 10/0051 |
| | | | 296/93 |
| 2014/0021739 A1* | 1/2014 | Shimizu ................. | B60J 5/0402 |
| | | | 296/146.5 |
| 2014/0117707 A1* | 5/2014 | Yamada ................. | B21D 19/08 |
| | | | 296/146.9 |
| 2014/0132028 A1* | 5/2014 | Yamada ................. | B60J 5/0402 |
| | | | 296/146.2 |
| 2014/0137412 A1* | 5/2014 | Yamada ................. | B60J 5/0402 |
| | | | 29/897.2 |
| 2014/0217773 A1* | 8/2014 | Shimizu ................. | B60J 5/0402 |
| | | | 296/146.6 |
| 2015/0108785 A1* | 4/2015 | Yokota ................... | B60J 5/0408 |
| | | | 296/146.5 |
| 2015/0283885 A1* | 10/2015 | Kyung ................... | B60J 5/0402 |
| | | | 296/146.2 |
| 2016/0167491 A1* | 6/2016 | Nakaguchi ............. | B60J 5/0402 |
| | | | 49/504 |
| 2016/0200181 A1* | 7/2016 | Sato ....................... | B23K 11/14 |
| | | | 296/146.2 |

FOREIGN PATENT DOCUMENTS

| | | |
|---|---|---|
| JP | 2003-011675 A | 1/2003 |
| JP | 2003-072383 A | 3/2003 |
| JP | 2005-132232 A | 5/2005 |
| JP | 2006-056472 A | 3/2006 |
| JP | 2006-082749 A | 3/2006 |
| JP | 2011-068181 A | 4/2011 |

OTHER PUBLICATIONS

Chinese Office Action, dated Feb. 17, 2017 and English Translation thereof.

* cited by examiner

FIG.12  -BACKGROUND ART-
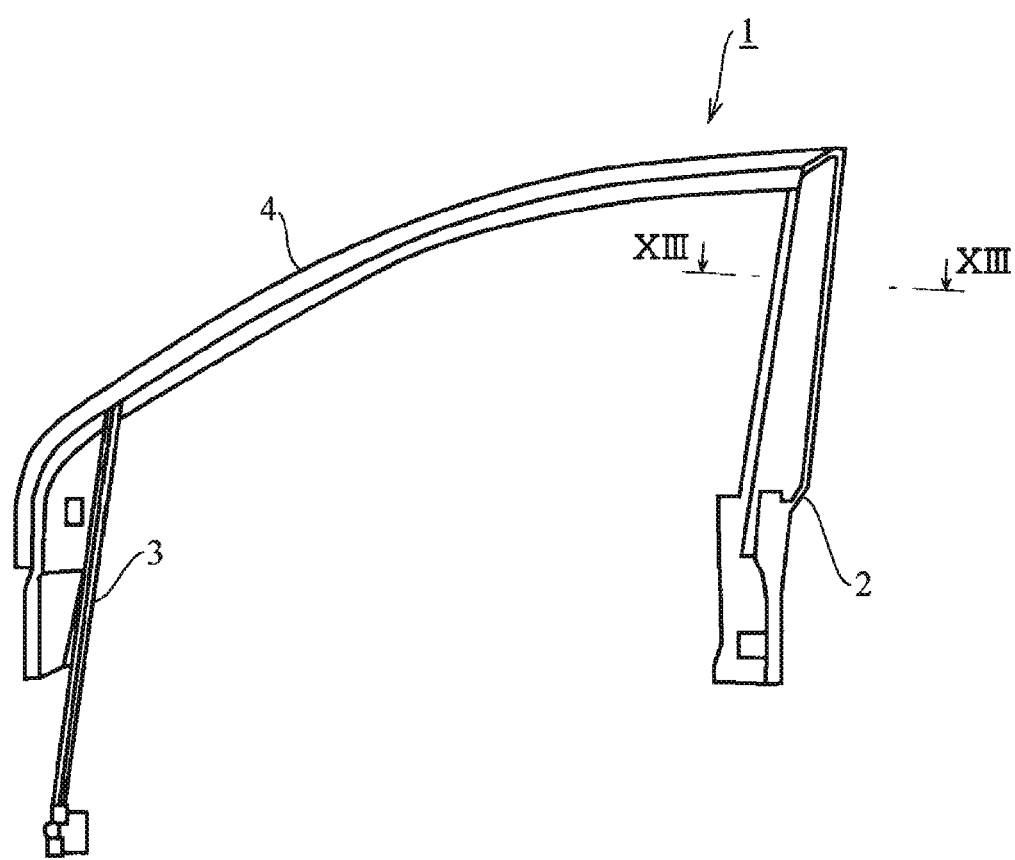

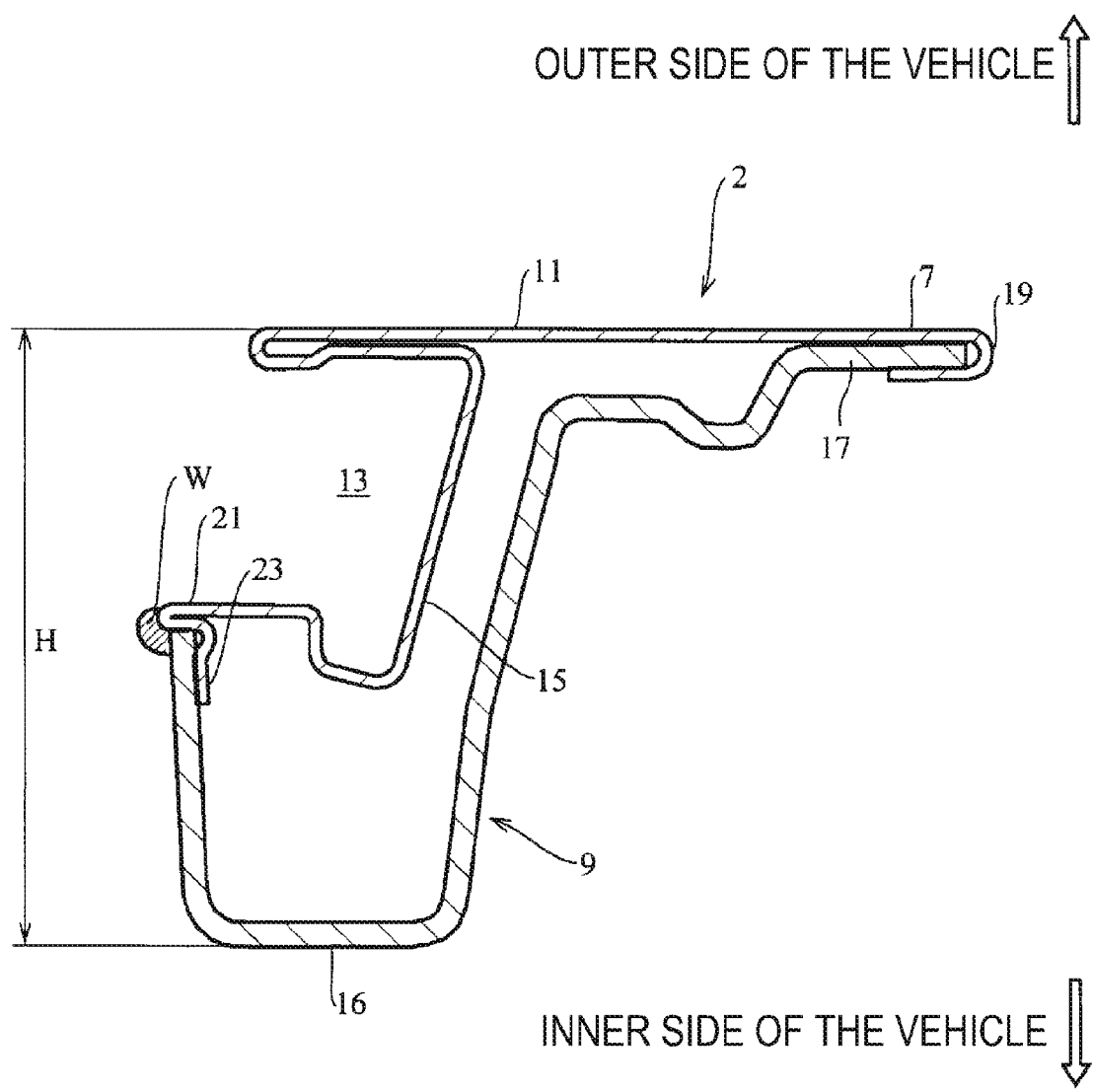
FIG.13 -BACKGROUND ART-

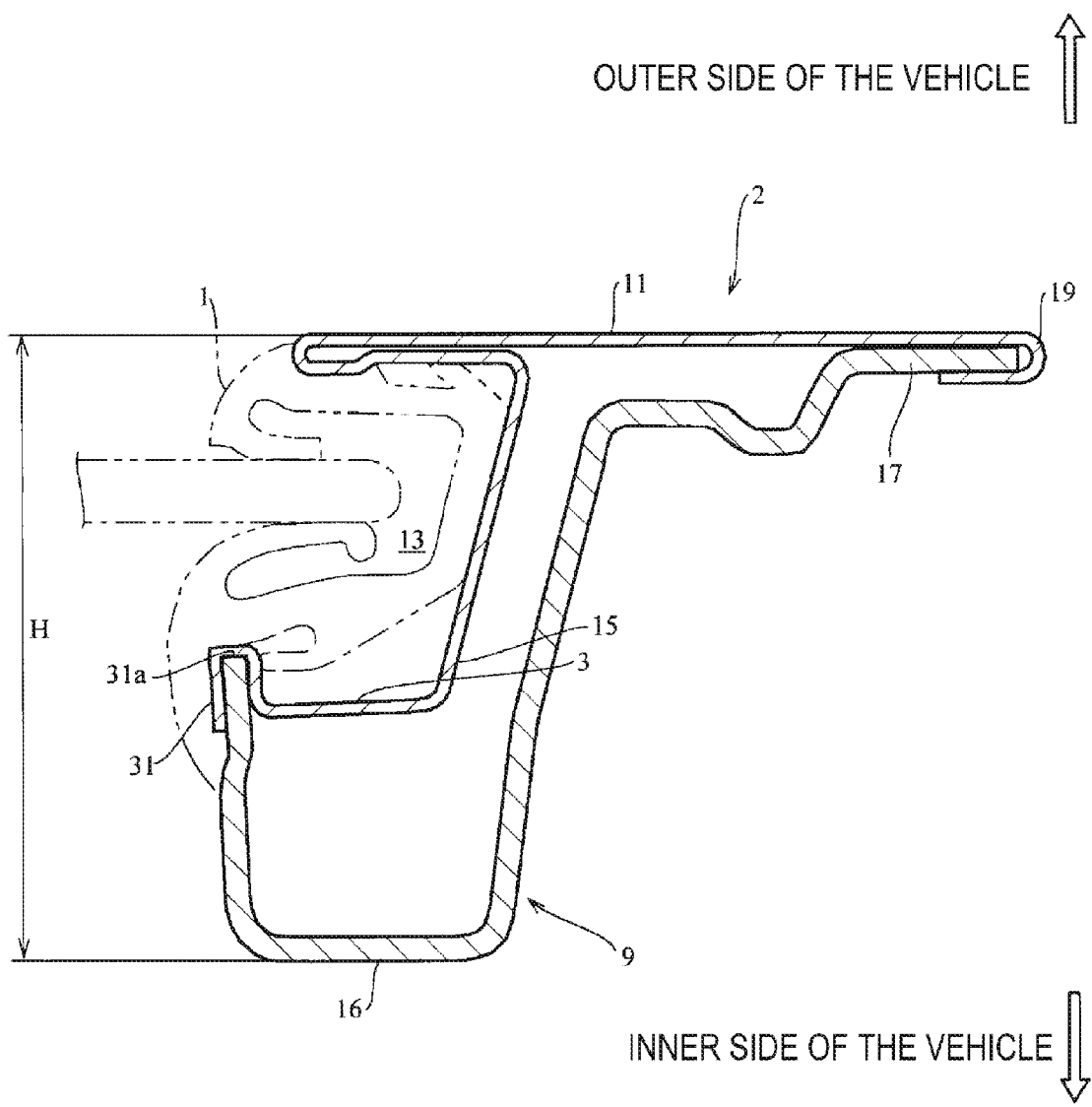
FIG.14 -BACKGROUND ART-

DOOR FRAME

TECHNICAL FIELD

The present invention relates to a door frame.

BACKGROUND ART

Generally, there is a column of a door frame of a vehicle as illustrated in FIGS. 12 and 13. FIG. 12 is a front view illustrating a configuration of a door frame, and FIG. 13 is a cross-sectional view taken along line XIII-XIII in FIG. 12.

As illustrated in FIG. 12, a door frame 1 includes a lower frame 3, a center pillar 2, and an upper frame 4. The lower frame 3 and the center pillar 2 serve as columns that guide lifting of a window glass. The upper frame 4 is coupled to the lower frame 3 and the center pillar 2 in a state where the lower frame and the center pillar are separated from each other, and defines a top dead point of the window glass.

As illustrated in FIG. 13, the center pillar 2 as a column includes an outer member 7 and an inner member 9 that is attached to the outer member 7. The inner member 9 is located at an inner side of the vehicle of the outer member 7.

The outer member 7 includes a design portion 11 and a groove forming portion 15 that forms a groove 13 for guiding lifting the window glass.

The inner member 9 includes a body portion 16 that has a substantially U-shaped cross-section and an attachment portion 17 that extends from the body portion 16 along the design portion 11.

A folded portion 21 and an attachment portion 23 extending to the inner side of the vehicle from the folded portion 21 are formed on a side portion on the inner side of the vehicle of the groove forming portion 15 of the outer member 7. The attachment portion 23 is located inside the body portion 16 of the inner member 9.

The outer member 7 is welded to the inner member 9 in a state where an end face of one side portion of the body portion 16 of the inner member 9 comes into contact with the folded portion 21 of the outer member 7. In FIG. 13, reference sign W represents a weld bead.

A hemming portion 19 surrounding the attachment portion 17 of the inner member 9 is formed in the design portion 11 of the outer member 7. By sandwiching the attachment portion 17 of the inner member 9 between the hemming portion 19 of the outer member 7, the outer member 7 is attached to the inner member 9 (for example, see Patent Literature 1).

Another configuration is known as illustrated in FIG. 14 (see Patent Literature 2). A folded portion 31 including a groove is formed on a side portion on the inner side of the vehicle of the groove forming portion 15 of the outer member 7. An end of one side portion of the body portion 16 of the inner member 9 is inserted into the groove of the folded portion 31. In a state where an end face of the end portion of the inner member 9 comes into contact with a bottom 31a of the folded portion 31, the outer member 7 is attached to the inner member 9 using a resistance welding method or the like.

CITATION LIST

Patent Literature

Patent Literature 1: Japanese Unexamined Patent Application Publication No. 2005-132232

Patent Literature 2: Japanese Unexamined Patent Application Publication No. 2011-068181

SUMMARY OF THE INVENTION

Technical Problem

In the column of the door frame illustrated in FIGS. 13 and 14, an end face of the side portion of the body portion 16 of the inner member 9 comes into contact with the outer member 7 to position the column, and the outer member 7 and the inner member 9 are welded to each other in this state.

However, when welding is performed in a state where the end face of the inner member 9 comes into contact with the outer member 7, there is a problem in that accuracy of a dimension (dimension H in FIGS. 13 and 14) in the vehicle width direction of the column of the door frame is poor.

The present invention is made in consideration of the above-mentioned problem and an object thereof is to provide a door frame having a column with high dimensional accuracy.

Solution to Problem

In order to achieve the above-mentioned object, according to an aspect of the present invention, a door frame includes a column, wherein the column includes: an outer member; and an inner member, which is attached to the outer member and of which at least a part is located at an inner side of the vehicle of the outer member, wherein the outer member includes: a base portion; and a first bent portion that is bent at an end portion of the base portion with respect to the base portion and extends to the inner side of the vehicle, wherein the inner member includes: a side portion that has faces, which respectively face the base portion and the first bent portion, and wherein the first bent portion of the outer member is welded to the side portion of the inner member in a state where a gap is formed between the base portion of the outer member and the face of the side portion of the inner member, which faces the base portion.

Advantageous Effects of Invention

By adjusting a gap formed between an end face of a side portion of an inner member and a base portion of an outer member, it is possible to enhance dimensional accuracy of a column of a door frame.

Other advantageous effects of the present invention will become apparent from embodiments to be described below and the accompanying drawings.

BRIEF DESCRIPTION OF THE DRAWINGS

FIG. 12 is a front view illustrating a door frame according to the background art.

FIG. 13 is a cross-sectional view taken along line XIII-XIII in FIG. 12.

FIG. 14 is a diagram illustrating another example of the background art.

DESCRIPTION OF EMBODIMENTS

First Embodiment

Figure 1:
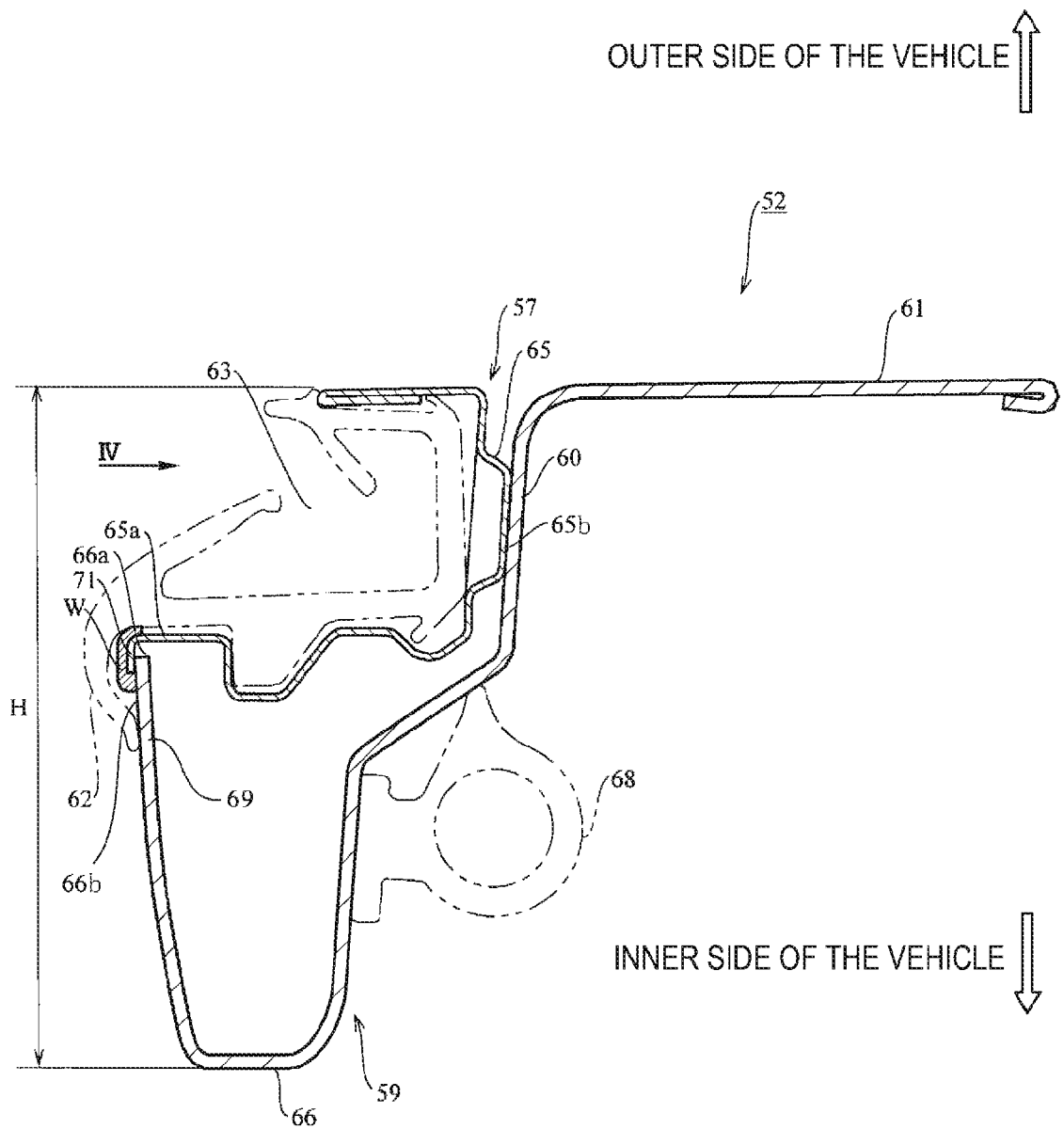
FIG. 1 is a diagram illustrating a door frame according to a first embodiment of the present invention and is a cross-sectional view taken along line I-I in FIG. 3.
Figure 2:
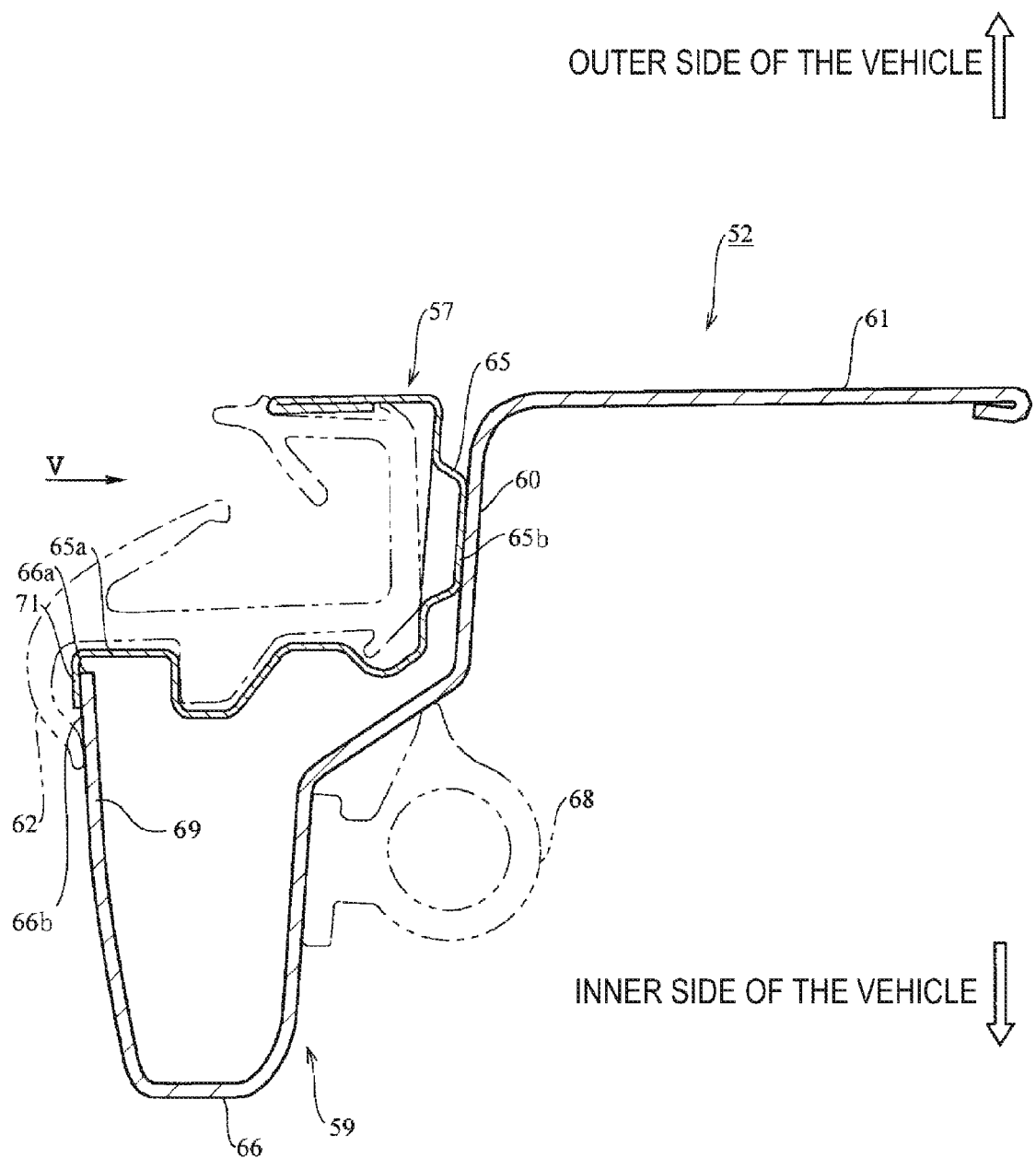
FIG. 2 is a cross-sectional view taken along line II-II in FIG. 3.
Figure 3:
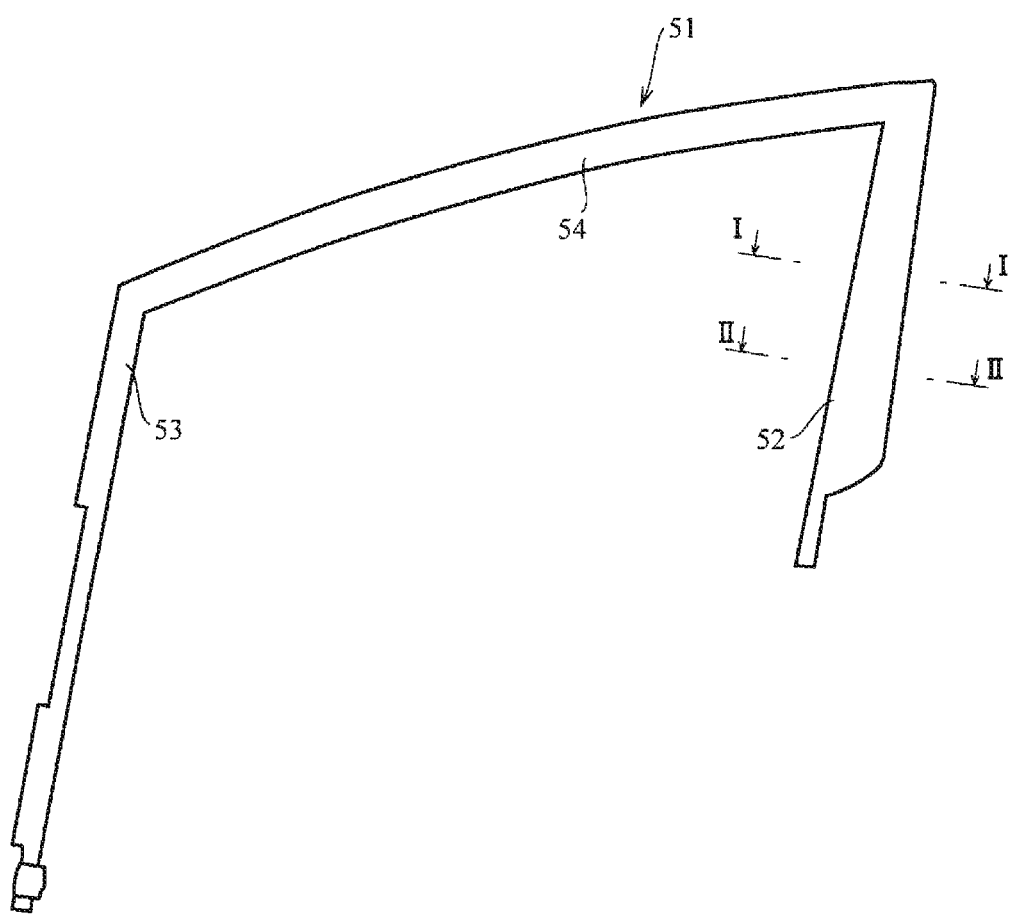
FIG. 3 is a front view of the door frame.
Figure 4:
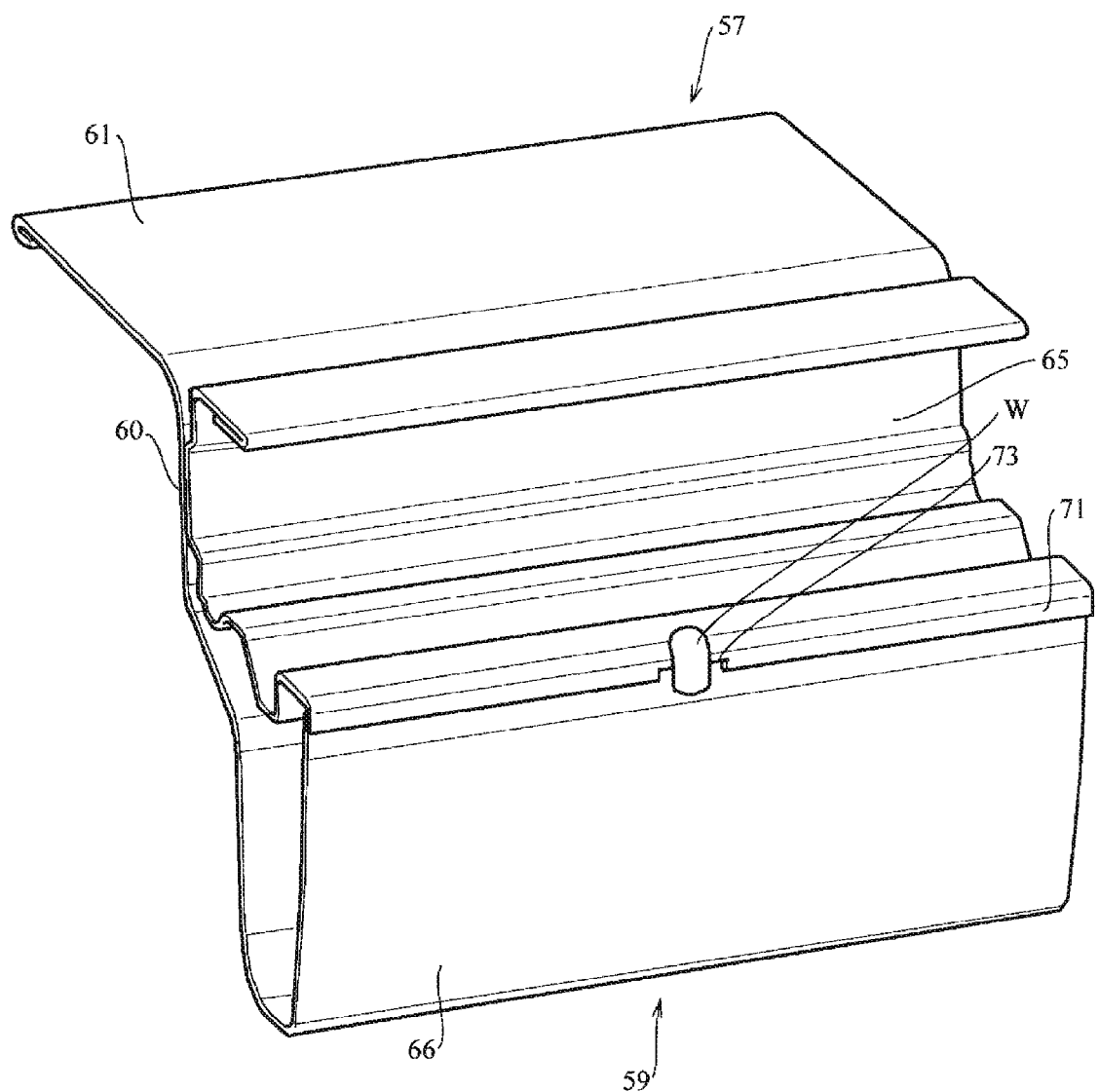
FIG. 4 is an arrow view taken along direction IV in FIG. 1.
Figure 5:
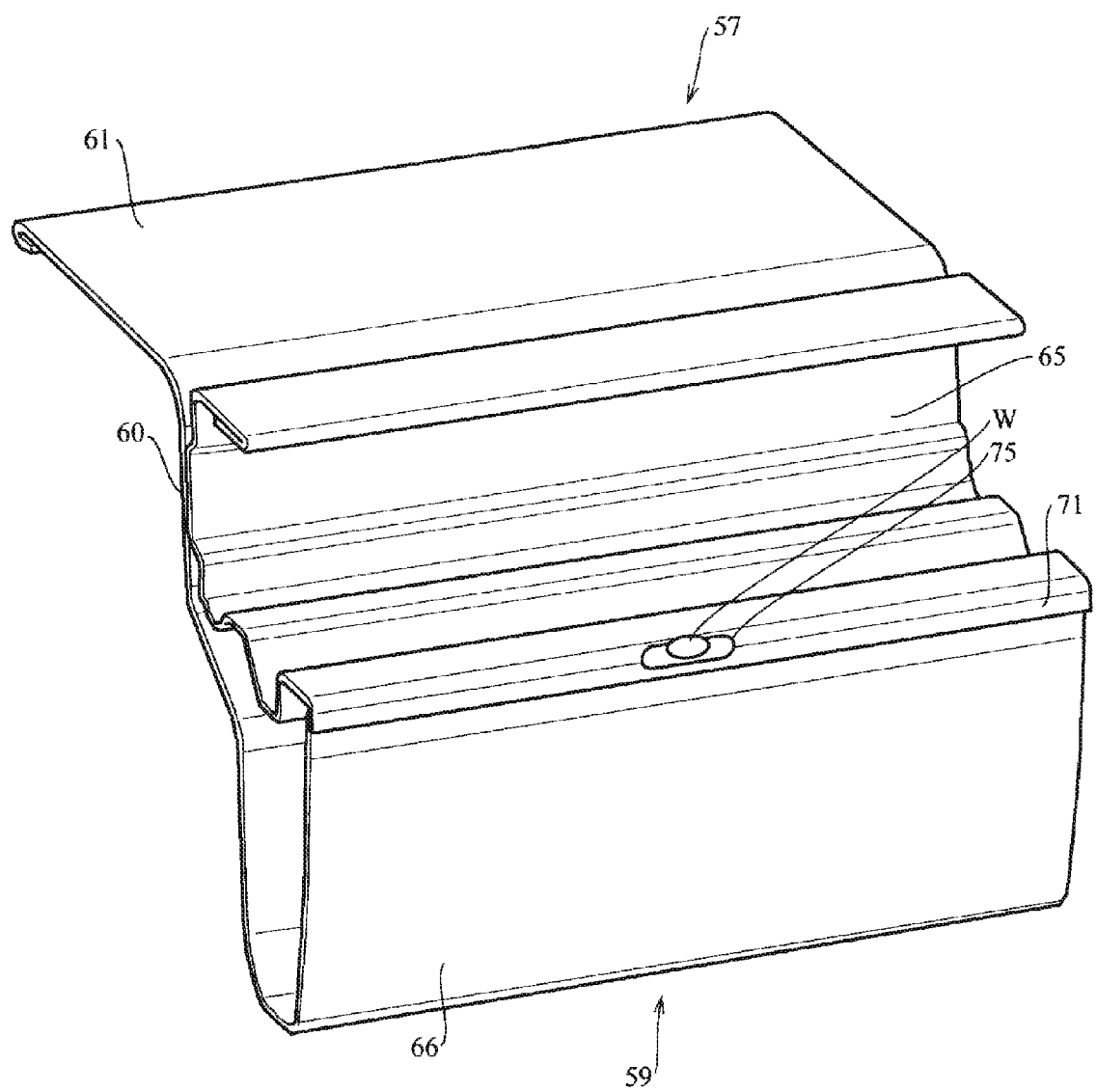
FIG. 5 is a diagram illustrating a second embodiment.

A door frame according to a first embodiment of the present invention will be described below with reference to FIGS. 1 to 4. FIG. 1 is a diagram illustrating a door frame according to the first embodiment of the present invention and is a cross-sectional view taken along line I-I in FIG. 3. FIG. 2 is a cross-sectional view taken along line II-II in FIG. 3. FIG. 3 is a front view of the door frame. FIG. 4 is an arrow view taken along direction IV in FIG. 1.

As illustrated in FIG. 3, a door frame 51 includes a lower frame 53, a center pillar 52, and an upper frame 54. The lower frame 53 and the center pillar 52 serve as columns that guide lifting of a window glass. The upper frame 54 is coupled to the lower frame 53 and the center pillar 52 in a state where the lower frame 53 and the center pillar 52 are separated from each other. The upper frame 54 defines a top dead point of the window glass.

The center pillar 52 as a column will be described below with reference to FIGS. 1 and 2. In the drawings, the upper side in the drawing shows an outer side of the vehicle and the lower side in the drawing shows an inner side of the vehicle.

The center pillar 52 includes an outer member 57 and an inner member 59. The inner member 59 is attached to the outer member 57, and at least a part thereof is located on the inner side of the vehicle of the outer member 57.

The outer member 57 includes a groove forming portion 65 forming a groove 63 that guides lifting of a window glass. A glass run channel 62 that comes into contact with a side portion of the window glass to suppress water or dust from being infiltrated into the inside of the vehicle is formed in the groove forming portion 65.

The inner member 59 is a member having a substantial U-shaped cross-section. The inner member 59 includes a body portion 66 that forms a bag portion in cooperation with the outer member 57, an attachment portion 60, and a design portion 61. The attachment portion 60 extends from the body portion 66 and is attached to the groove forming portion 65 of the outer member 57, by welding. The design portion 61 is bent from the attachment portion 60 and is exposed to the outside. The design portion 61 extends in a direction along the side surface of a vehicle.

A plurality of protruding portions 65b that protrude toward the attachment portion 60 of the inner member 59 and come into contact with the attachment portion 60 are formed in the groove forming portion 65 of the outer member 57. The protruding portions 65b and the attachment portion 60 of the inner member 59 are welded.

A weather strip 68 that comes into contact with the vehicle body to suppress water, dust, or the like from being infiltrated into an inner side of the vehicle is provided on the surface of the body portion 66 facing the vehicle body.

A base portion 65a extending in a direction along the side surface of the vehicle is formed at an end portion at the inner side of the vehicle of the groove forming portion 65. A first bent portion 71 that is bent with respect to the base portion 65a and extends toward the inner member 59 is formed at an end of the base portion 65a. In the illustrated example, the first bent portion 71 forms an angle of about 90 degrees about the base portion 65a. This angle may be larger than 90 degrees.

The inner member 59 includes a side portion 69 that extends along the first bent portion 71 of the outer member 57. The side portion 69 includes an end face 66a facing the base portion 65a of the outer member 57 and a side face 66b facing the first bent portion 71.

In a state where a gap is formed between the base portion 65a of the outer member 57 and the end face 66a of the side portion 69 of the inner member 59 (the face facing the base portion 65a), the first bent portion 71 of the outer member 57 is welded to the side portion 69 of the inner member 59. In the illustrated example, the first bent portion 71 of the outer member 57 is welded to the side face 66b of the side portion 69 of the inner member 59. In FIG. 1, reference sign W shows a weld bead.

As illustrated in FIG. 4, plural rectangular notches 73 are formed in a longitudinal direction in the first bent portion 71 of the outer member 57. The circumferential edges of the notches 73 are welded to the inner member 59.

The weld bead W is covered with a lip of the glass run channel 62 as illustrated in FIG. 1.

According to the above-mentioned configuration, the following advantageous effects can be obtained. (1) In a state where a gap is formed between the base portion 65a of the outer member 57 and the end face 66a of the side portion 69 of the inner member 59, the first bent portion 71 of the outer member 57 is welded to the side portion 69 of the inner member 59. Accordingly, it is possible to enhance dimensional accuracy of the center pillar 52 indicated by a dimension H in FIG. 1 by adjusting the gap between the end face 66a and the base portion 65a when the inner member 59 and the outer member 57 are welded to form the center pillar 52.

(2) A plurality of notches 73 are formed in the longitudinal direction in the first bent portion 71 of the outer member 57. The circumferential edges of the notches 73 are welded to the inner member 59. Accordingly, a flow of the weld bead W is stopped by the walls of the notches 73 and good appearance can be obtained.

The shape of the side portion 69 of the inner member 59 is not limited to the illustrated shape. For example, the end portion of the side portion 69 at a side of the base portion 65a may be bent to extend along the base portion 65a.

In the illustrated example, the side portion 69 of the inner member 59 is disposed inside the first bent portion 71 of the outer member 57, but the side portion 69 of the inner member 59 may be disposed outside the first bent portion 71 of the outer member 57. In this case, notches 73 or through-holes may be formed in the side portion 69 and the circumferential edges of the notches 73 or the through-holes may be welded to the first bent portion 71.

The gap is formed between the end face 66a of the side portion 69 of the inner member 59 and the base portion 65a of the outer member 57, but a gap may be formed or may not be formed between the first bent portion 71 of the outer member 57 and the side face 66b of the side portion 69 of the inner member 59.

In this embodiment, regarding the outer member 57 and the inner member 59 constituting the center pillar 52, an example in which the first bent portion 71 of the outer member 57 is welded to the side portion 69 of the inner member 59 in a state where a gap is formed between the base portion 65a of the outer member 57 and the end face 66a of the side portion 69 of the inner member 59 is described. However, the present invention is not limited to this configuration. The above-mentioned configuration may be applied to an outer member 57 and an inner member 59 of the lower frame 53. The above-mentioned configuration may be applied to outer members 57 and inner members 59 of a rear column of a front door, a front column of the front door, a front column of a rear door, and a rear column of the rear door.

Second Embodiment

A door frame according to a second embodiment of the present invention will be described below with reference to FIGS. 5, 6, 7, and 8. In the first embodiment, the notches 73 are formed in the first bent portion 71, but in the second embodiment, a through-hole 75 having a elongated hole shape is formed in the first bent portion 71.

Figure 6:
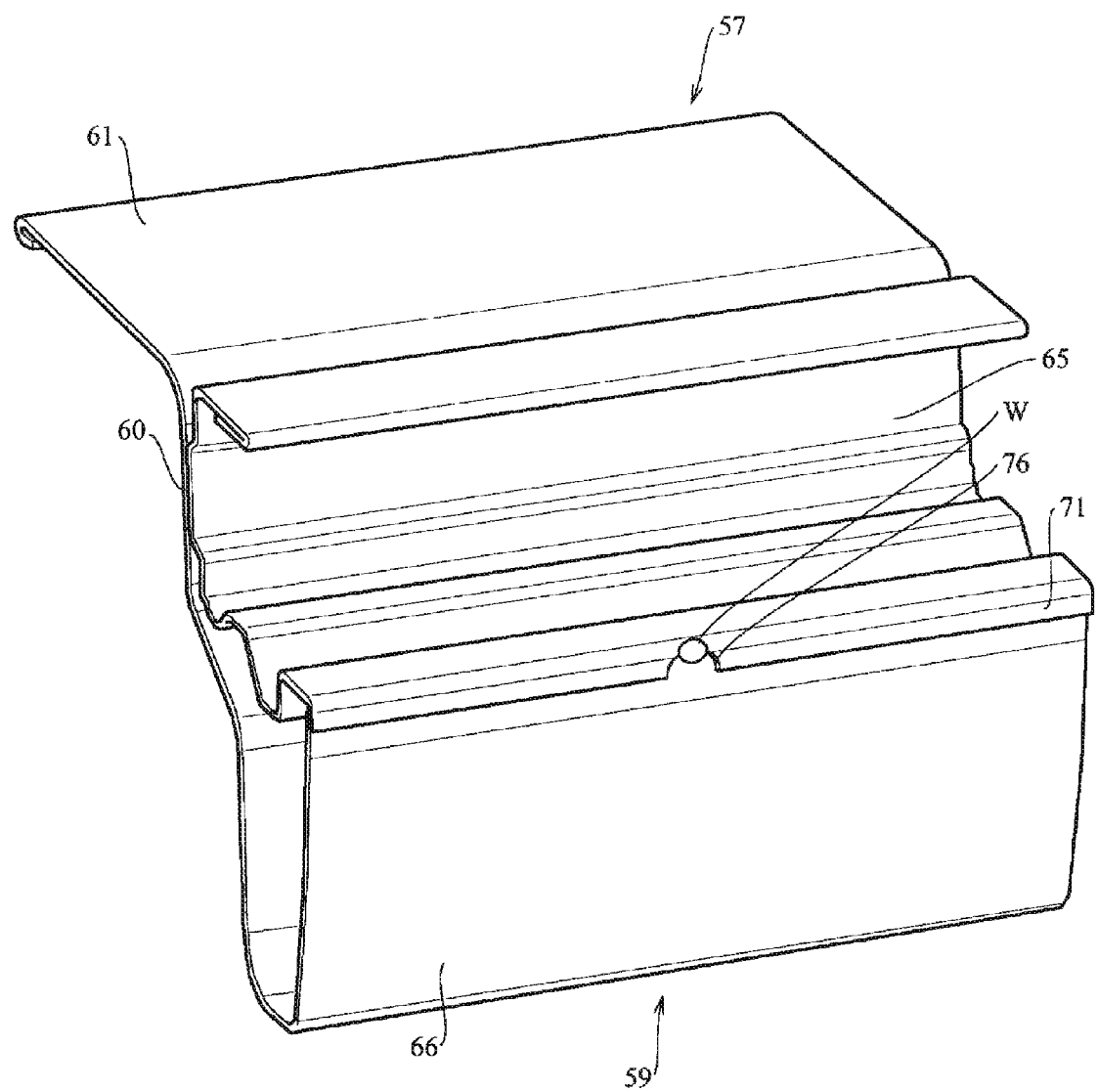
FIG. 6 is a diagram illustrating a modified example of the second embodiment.
Figure 7:
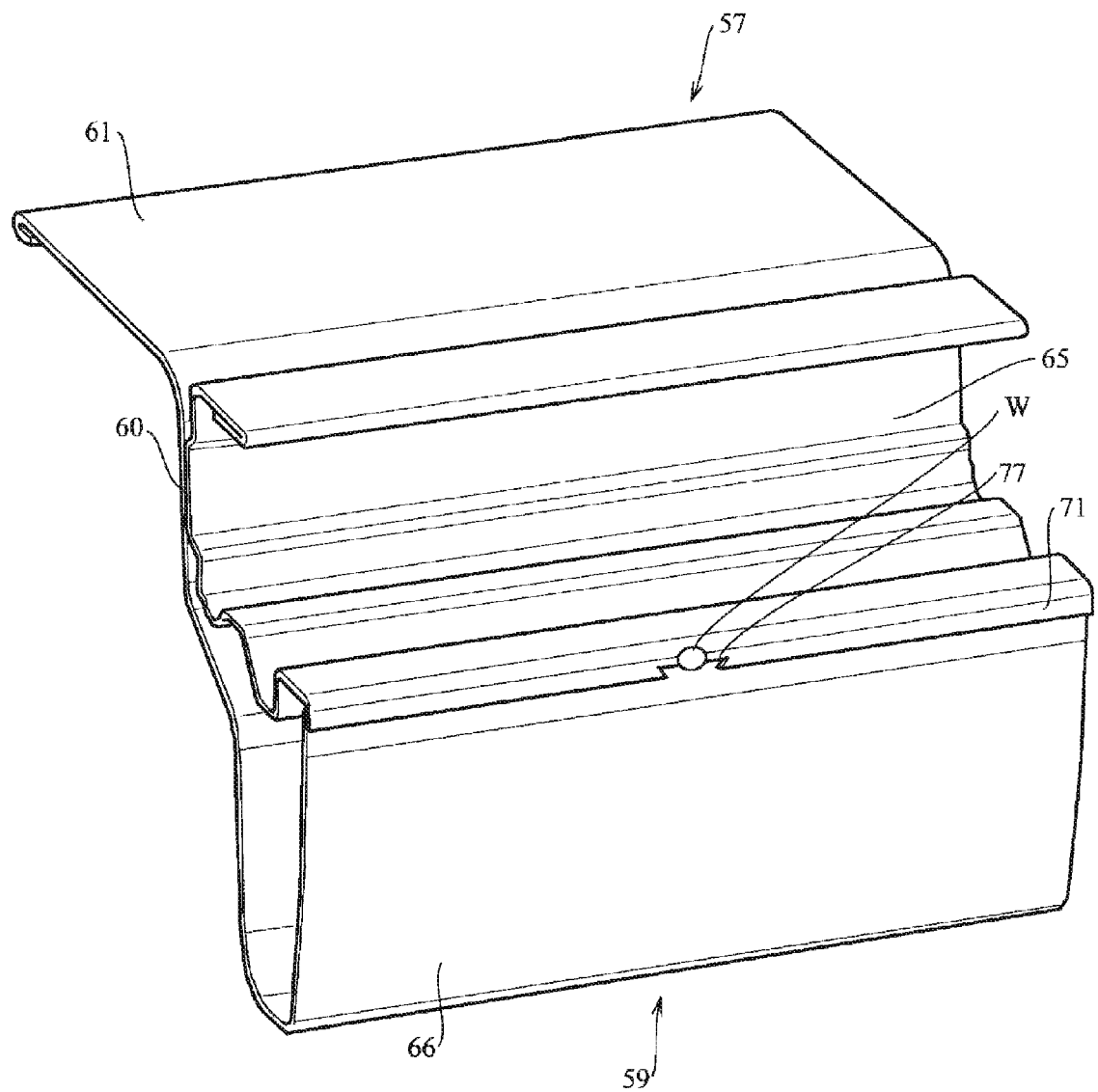
FIG. 7 is a diagram illustrating another modified example of the second embodiment.
Figure 8:
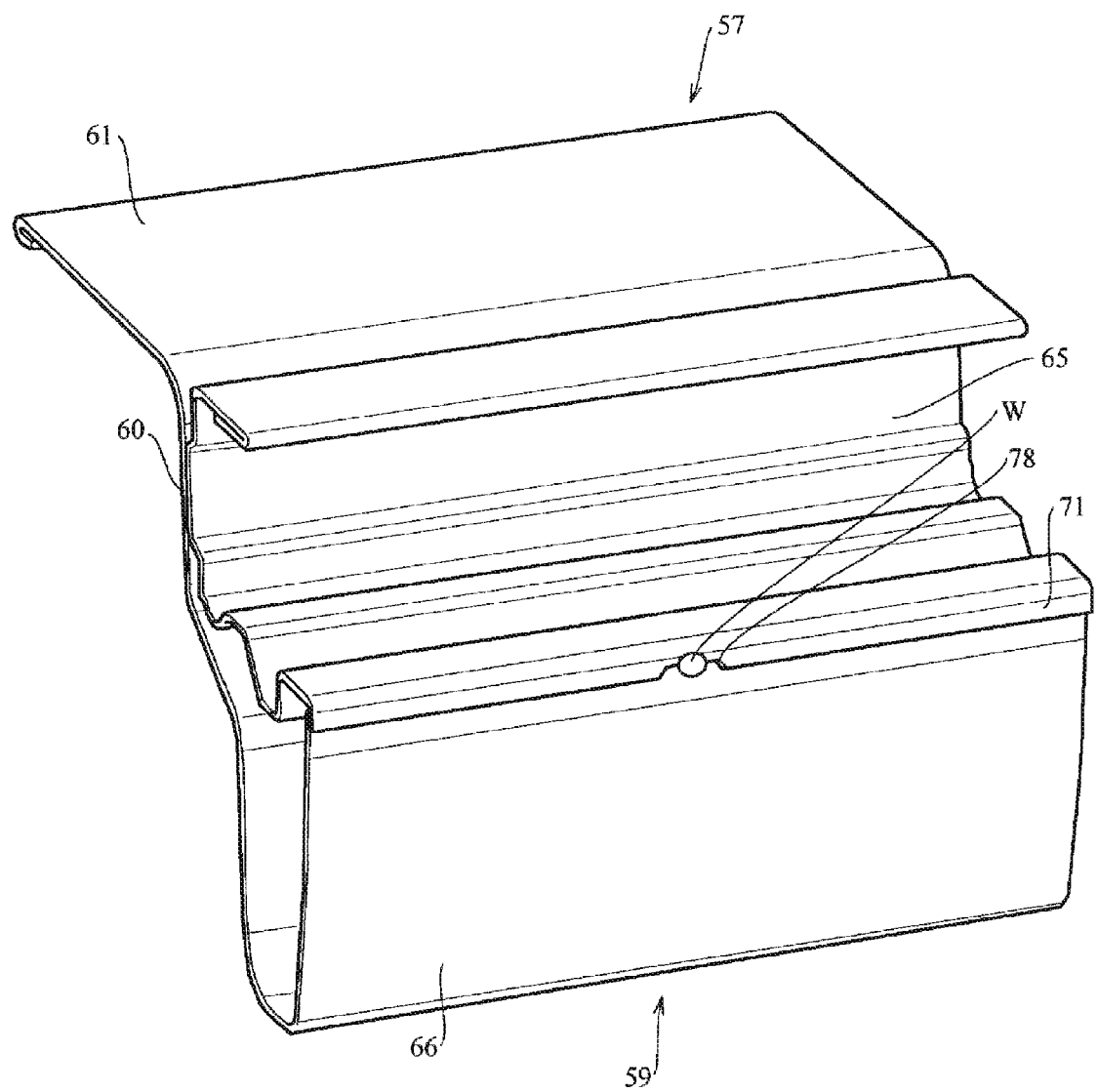
FIG. 8 is a diagram illustrating still another modified example of the second embodiment.

The shape of the notch 73 or the through-hole 75 is not limited to a rectangular shape. For example, as illustrated in FIG. 6, a semicircular notch 76 illustrated in FIG. 6, a dovetailed notch 77 illustrated in FIG. 7, or a trapezoidal notch 78 illustrated in FIG. 8 may be employed. Alternatively, the through-hole may have a shape such as a semicircular shape, a dovetailed shape, or a trapezoidal shape.

Third Embodiment

Figure 9:
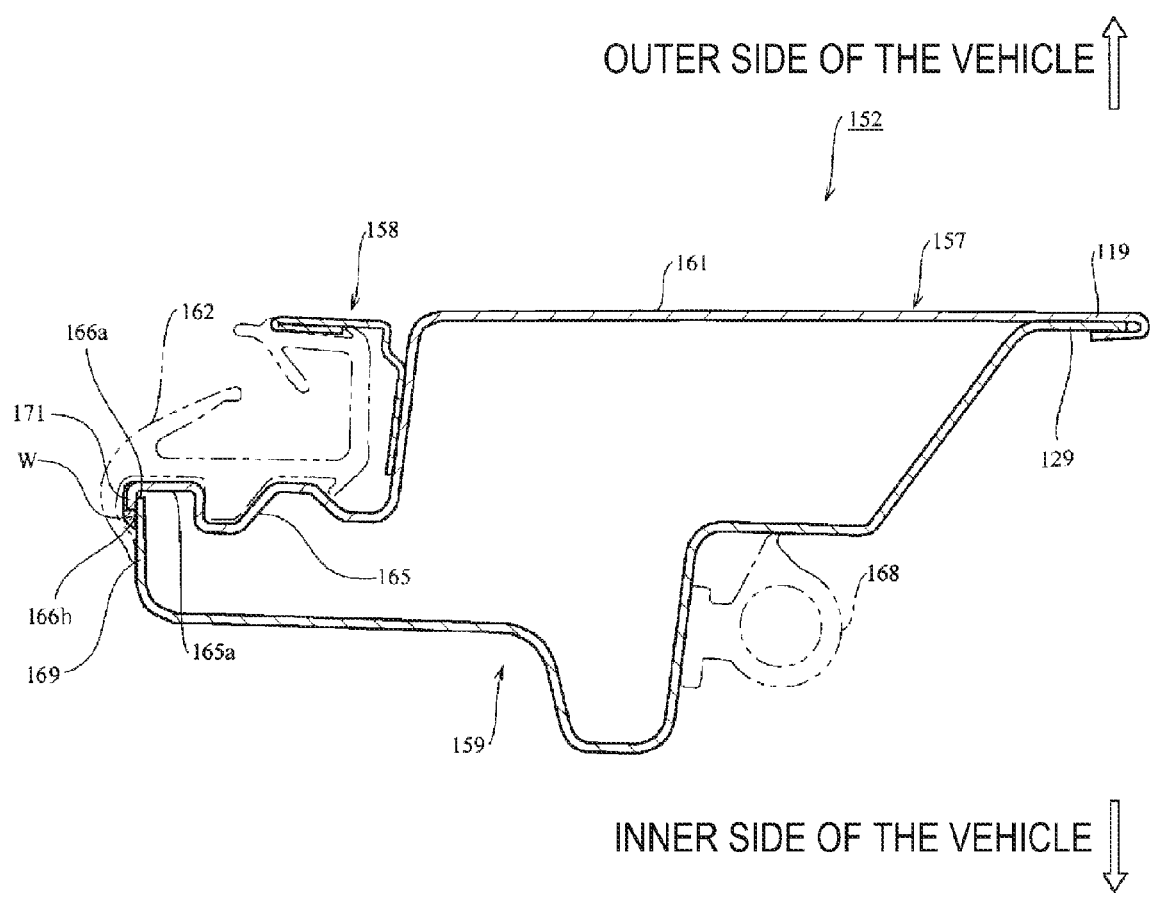
FIG. 9 is a diagram illustrating a third embodiment.

A door frame according to a third embodiment of the present invention will be described below with reference to FIG. 9. This embodiment is different from the first embodiment, in a cross-sectional shape of a center pillar 152.

The center pillar 152 includes a first outer member 157, a second outer member 158, and an inner member 159. The first outer member 157 and the second outer member 158 are located on the outer side of the vehicle. At least a part of the inner member 159 is located on the inner side of the vehicle of the first outer member 157, and the inner member is attached to the first outer member 157.

The first outer member 157 includes a groove forming portion 165 forming a groove 163 that guides lifting of a window glass in cooperation with the second outer member 158. A glass run channel 162 that suppresses water, dust, or the like from being infiltrated into the inside of the vehicle is formed in the second outer member 158 and the groove forming portion 165 with a side portion of the window glass interposed therebetween. A design portion 161 that is exposed to the outside is formed in the first outer member 157.

The inner member 159 forms a bag portion having a closed cross-section in cooperation with the first outer member 157.

A weather strip 168 that comes into contact with the vehicle body to suppress water, dust, or the like from being infiltrated into the inside of the vehicle is provided on the surface of the inner member 159 facing the vehicle body.

A base portion 165a extending in a direction along the side surface of the vehicle is formed at an end portion at the inner side of the vehicle of the groove forming portion 165. A first bent portion 171 that is bent with respect to the base portion 165a and extends toward the inner member 159 is formed at an end portion of the base portion 165a. In the illustrated example, the first bent portion 171 forms an angle of about 90 degrees about the base portion 165a.

The inner member 159 includes a side portion 169 that extends along the first bent portion 171 of the first outer member 157. The side portion 169 includes an end face 166a facing the base portion 165a of the first outer member 157 and a side face 166b facing the first bent portion 171.

In a state where a gap is formed between the end face 166a of the side portion 169 of the inner member 159 and the base portion 165a of the first outer member 157, the first bent portion 171 of the first outer member 157 is welded to the side portion 169 of the inner member 159.

A hemming portion 119 that surrounds the other side portion of the inner member 159 is formed in the design portion 161 of the first outer member 157. The inner member 159 has an attachment portion 129 extending along the design portion 161. By sandwiching the attachment portion 129 of the inner member 159 between the hemming portion 119 of the first outer member 157, the first outer member 157 is attached to the inner member 159.

According to the above-mentioned configuration, the following advantageous effects can be obtained.

In a state where a gap is formed between the base portion 165a of the first outer member 157 and the end face 166a of the side portion 169 of the inner member 159, the first bent portion 171 of the first outer member 157 is welded to the side portion 169 of the inner member 159. Accordingly, it is possible to enhance dimensional accuracy of the center pillar 152 by adjusting the gap between the end face 166a and the base portion 165a when the inner member 159 and the outer member 157 are welded to form the center pillar 152.

Fourth Embodiment

Figure 10:
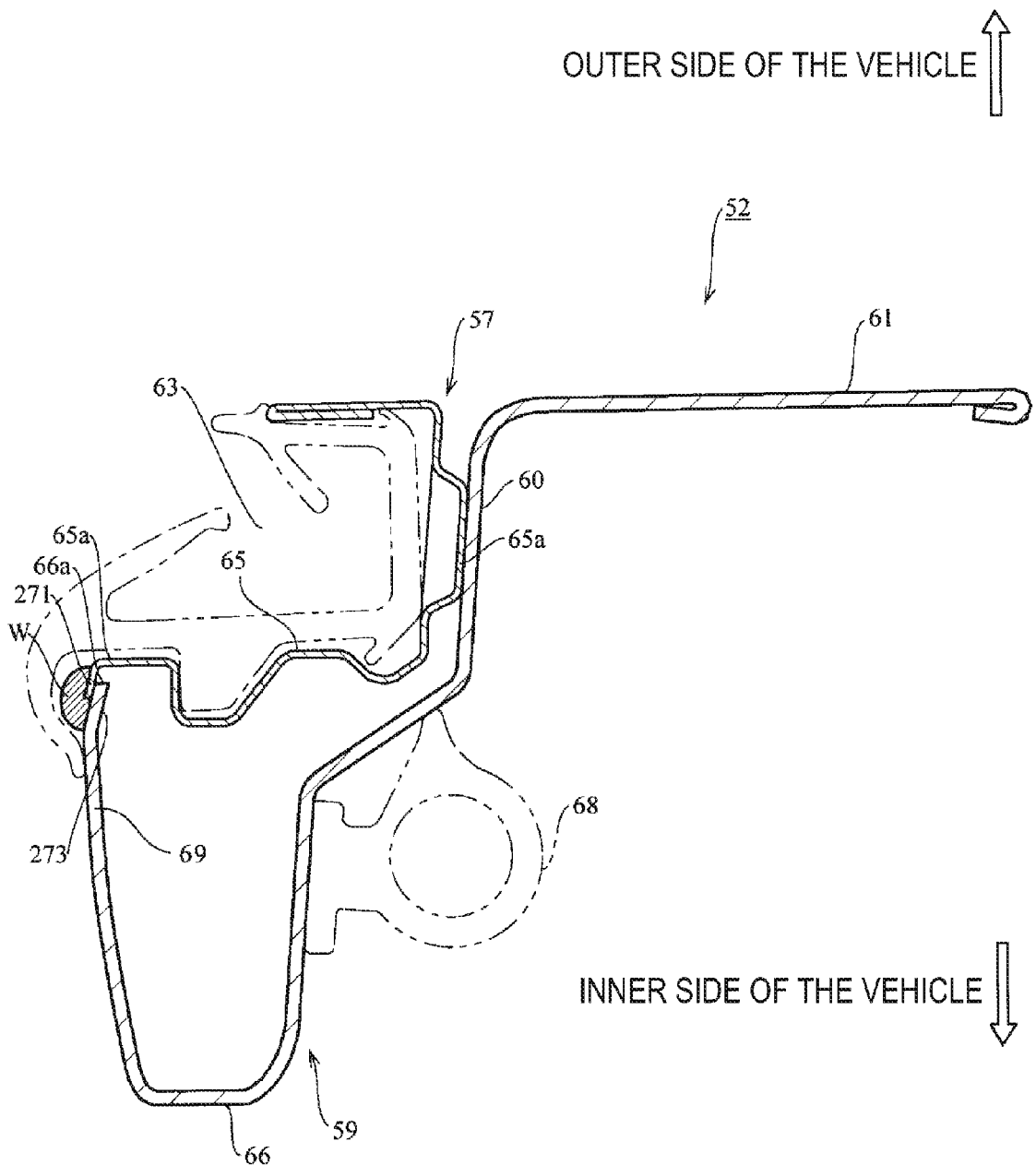
FIG. 10 is a diagram illustrating a fourth embodiment.

A door frame according to a fourth embodiment of the present invention will be described below with reference to FIG. 10. This embodiment is different from the first embodiment, in that the angle formed by the first bent portion 271 and the base portion 65a is different and a second bent portion 273 coming into surface-contact with the first bent portion 271 of the outer member 57 is formed in the inner member 59.

In this embodiment, the angle formed by the groove forming portion 65 of the first bent portion 271 and the base portion 65a is set to be larger than 90 degrees.

According to this embodiment, the following advantageous effects can be obtained.

(1) Since the angle formed by the first bent portion 271 and the base portion 65a is set to be larger than 90 degrees, it is possible to improve formability in forming the first bent portion 271 by bending.

(2) The second bent portion 273 coming into surface-contact with the first bent portion 271 of the outer member 57 is formed in the inner member 59. Accordingly, since a residual stress due to welding is concentrated on the base portion of the second bent portion 273, an influence of thermal strain due to welding on the body portion 66 other than the second bent portion 273 can be decreased, and good appearance can be obtained.

Fifth Embodiment

Figure 11:
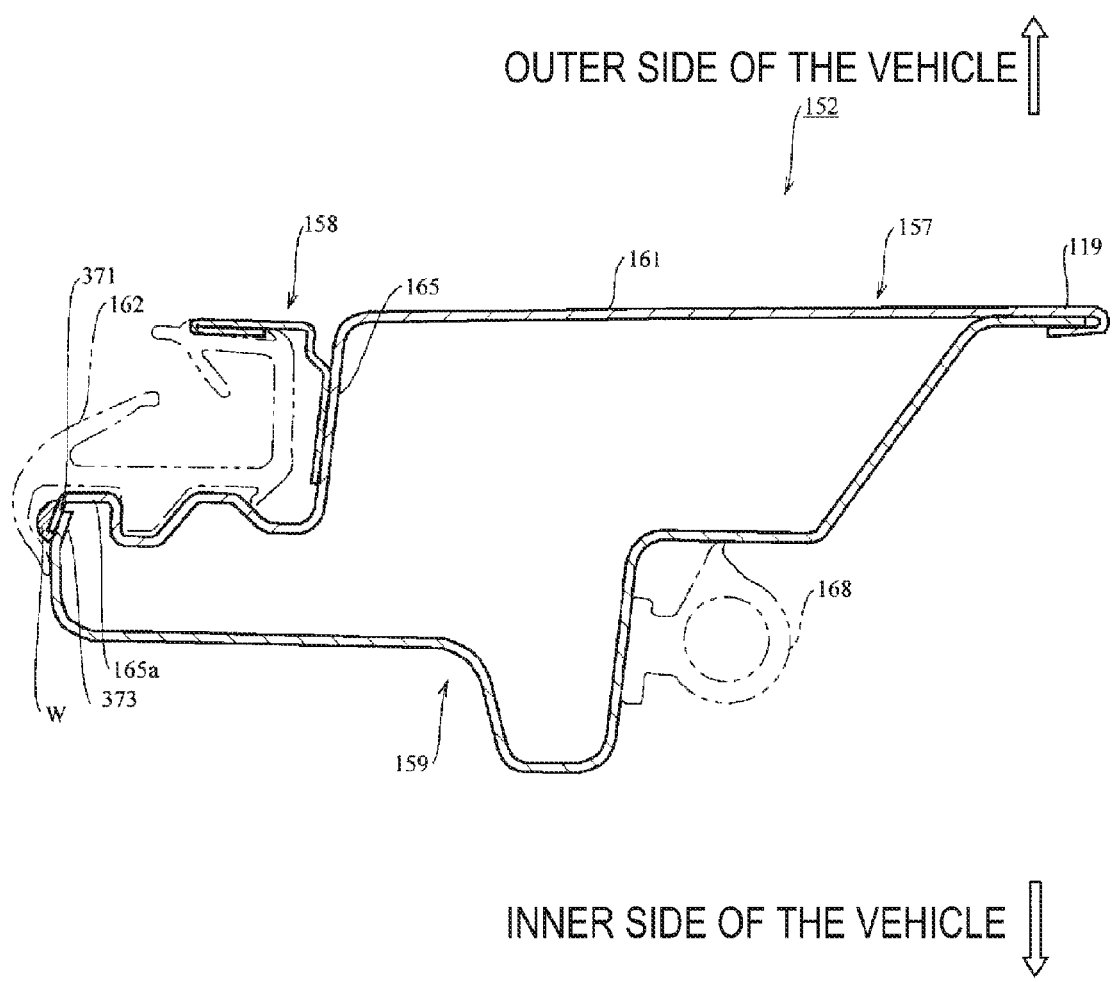
FIG. 11 is a diagram illustrating a fifth embodiment.

A door frame according to a fifth embodiment of the present invention will be described below with reference to FIG. 11. This embodiment is different from the third embodiment, in the angle formed by the first bent portion 371 and the base portion 165a and a second bent portion 373 coming into surface-contact with the first bent portion 371 of the first outer member 157 being formed in the inner member 159.

In this embodiment, the angle formed by the first bent portion 371 and the base portion 165a is set to be larger than 90 degrees.

According to this embodiment, the following advantageous effects can be obtained.

(1) Since the angle formed by the first bent portion 371 and the base portion 165a is set to be larger than 90 degrees, it is possible to improve formability in forming the first bent portion 371 by bending.

(2) The second bent portion 373 coming into surface-contact with the first bent portion 371 of the first outer member 157 is formed in the inner member 159. Accordingly, since a residual stress due to welding is concentrated on the base portion of the second bent portion 373, an influence of thermal strain due to welding on the inner member 159 other than the second bent portion 373 can be decreased, and good appearance can be obtained.

While the present invention has been described above in detail in conjunction with specific embodiments, it should be obvious to those skilled in the art that the present invention can be changed or modified in various forms without departing from the sprit and scope of the present invention.

This application is based on Japanese Patent Application (Japanese Patent Application No. 2013-217075), filed Oct. 18, 2013, the content of which is incorporated by reference herein.

INDUSTRIAL APPLICABILITY

According to the present invention, a door frame having a column with good dimensional accuracy is provided.

The invention claimed is:

1. A door frame comprising
a column,
wherein the column includes:
an outer member; and
an inner member, which is attached to the outer member and of which at least a part is located at an inner side of the vehicle of the outer member,
wherein the outer member includes: a base portion; and a first bent portion that is bent at an end portion of the base portion with respect to the base portion and extends to the inner side of the vehicle,
wherein the inner member includes: a side portion that has faces, which respectively face the base portion and the first bent portion, and
wherein the first bent portion of the outer member is welded to the side portion of the inner member in a state where a gap is formed between the base portion of the outer member and the face of the side portion of the inner member, which faces the base portion.

2. The door frame according to claim 1,
wherein a plurality of notches or through-holes are formed in a longitudinal direction in the first bent portion of the outer member, and
wherein a circumferential edge of the notches or through-holes are welded to the inner member.

3. The door frame according to claim 1,
wherein a groove forming portion to guide lifting of a window glass is formed in the outer member,
wherein a glass run channel that comes into contact with the window glass is formed in the groove forming portion, and
wherein the glass run channel covers a weld bead.

4. The door frame according to claim 1,
wherein a second bent portion that comes into surface-contact with the first bent portion of the outer member is formed in the inner member.

* * * * *